UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

COMPOUND OF PYROXYLIN.

SPECIFICATION forming part of Letters Patent No. 559,823, dated May 12, 1896.

Original application filed August 28, 1893, Serial No. 484,234. Divided and this application filed June 19, 1895. Serial No. 553,302. (No specimens.)

*To all whom it may concern:*

Be it known that I, JOHN H. STEVENS, of the city of Newark, county of Essex, and State of New Jersey, have invented certain new and useful Improvements in Compounds of Pyroxylin, of which the following is a specification.

Compounds of pyroxylin, as is well known, are composed of pyroxylin combined with suitable solvents. The solvents are of two kinds—liquid and solid. Ether alcohol and wood-spirit are good examples of the liquid solvents, and ordinary gum-camphor is a solid solvent.

The present invention is related solely to liquid solvents and is a division of my original specification filed August 28, 1893, Serial No. 484,234.

For the action of solvents and the state of the art I refer to United States Patent No. 517,987, granted to me, and dated April 10, 1894.

There is a class of liquid substances which, while not in themselves useful solvents of pyroxylin, are valuable by reason of their use as diluents or by reason of their association with other solvents. They enable pyroxylin solutions to be diluted or rendered more fluid and impart important properties to the compound through their association with the other ingredients of the solvent mixture. Prominent examples of such liquids are alcohol and fusel-oil. These non-solvent menstrua are very useful in connection with camphor, as they liquefy the camphor and enable it to act as a solvent at low temperatures. Hence the value of the menstrua is not confined to the possession of solvent powers in themselves. The menstrua employed as diluents, however, though non-solvents in themselves, can be considered solvents in connection with other substances, as a useful diluent generally either increases the solvent power of the mixtures or at least does not impair it to any extent.

The present invention furnishes not only active solvents in the cold or at ordinary temperatures, but useful diluents for use as described.

As a rule the solvents heretofore known have been composed of simple substances or mixtures of the same. It is the object of the present invention to furnish a series of compound solvents by the use of which a great many of the important effects desired in pyroxylin mixtures can be cheaply and effectually secured.

Although the use of mixtures of simple solvents has been productive of effects which were improvements over the use of the simple substances unmixed, it has been attended with more or less difficulty, due especially to the different volatilities or lack of harmony or chemical union between the various constituent ingredients of the mixed solvents. Hence in evaporating a thin solution, for instance, to form a film, the action has not been continuous, but the film has been subjected to considerable variation in homogeneity, or surface appearance, largely due to these causes.

In carrying out my present invention I prepare a series of solvents or diluents by subjecting various mixtures of alcohols to the action of oxidizing agents. By this means I make solvents of new composition or a complex series of mixed ethers, which not only differ from the solvents heretofore known, but are distinct from a mixture made up of alcohol separately oxidized. In my United States Patent No. 269,340 I have disclosed the usefulness of oxidized wood-alcohol as a solvent of pyroxlin.

By the present invention I am enabled to secure not only the advantageous action of oxidized wood-alcohol, but where the wood-alcohol is associated with other alcohols during the process of oxidation I am satisfied that the reaction is extremely complex, producing a mixture consisting of compound ethers and other substances by the reaction between the alcohols and their oxidation derivatives. Doubtless the peculiar action which causes a mixture of two non-solvent substances to possess solvent properties, as illustrated in the power alcohol possesses of forming active solvents with the menstrua mentioned in my United States Patents Nos. 269,341 and 269,345, for instance, also has a large influence in the case of the present series of solvents. Whatever the causes may be, I find as a practical result that the oxidation products of a mixture of certain alcohols possess valuable solvent powers and extend the list of solvent substances for use in this art.

I find that while the mixture of alcohols may be such that the final oxidation products contain liquids of different volatilities the evaporation of my new solvents from pyroxylin compounds is more uniform and removes several of the difficulties connected with the use of simple mixtures of solvents heretofore referred to.

I have directed special attention to the production of oxidized products from the mixtures of primary alcohols represented in crude fusel-oil, and especially crude potato fusel-oil, because this is a cheap base on which to work, and the products, as a rule, are of an anhydrous nature—a property very desirable in pyroxylin solvents; but any of the alcohols can be mixed together in proportions according to the result required whether a light highly-volatile solvent is wanted or one which will evaporate slowly from the compound. If the more highly volatile alcohols preponderate, the result will evaporate more readily, and, on the other hand, the lesser volatility will be found in the oxidized mixtures of alcohols where the heavier fusel-oil alcohols, such as amyl alcohol, are in excess.

In manufacturing the present series of solvents I take, preferably, a fusel-oil containing as much as possible of the ethyl and propyl or lighter alcohols, all of which are well known constituents of certain varieties of crude fusel-oil, and distil such mixture of alcohols from sulfuric acid associated with peroxid of manganese, or chromate of potash, bichromate of potash, permanganate of potash, or any well-known agent which will oxidize the alcohols can be employed with the sulfuric acid. The oxidizing action of the different substances just mentioned and the general condition of the oxidizing reaction are well understood by chemists; but I give the following examples as a guide to the operator in carrying out my invention:

I have obtained good results by the use of the following formula for oxidation: mixture of fusel-oil alcohols, two parts, by weight; manganese peroxid, three parts, by weight; sulfuric acid, three parts, by weight; water, two parts, by weight. I mix these agents in a suitable containing vessel which is connected with a cooled condenser. The mixture begins to boil spontaneously, but requires the application of heat for the continuation of the process. The distillate is dehydrated and rendered neutral by suitable means and rectified by distillation from dry calcium chlorid. When crude fusel-oil is the mixture acted upon, I produce an excellent diluent for liquid solvents, or a menstruum for camphor for use in solid compounds. By separating the crude fusel-oil distillate into three portions, according to the boiling-points 90° centigrade, 125° centigrade, and 135° centigrade, I obtain, respectively, at 90° centigrade a liquid of a pleasant odor, which is an active solvent of pyroxylin in the cold as well as an excellent menstruum for camphor; at 125° centigrade a liquid of a pleasant odor, which dissolves pyroxylin when heated and is also a good menstruum for camphor; at 135° centigrade a liquid having a pleasing odor, which is a superior menstruum for camphor in making solid compounds of pyroxylin. By using a mixture of simply the lower alcohols of fusel-oil, like ethyl alcohol, isopropyl alcohol, and isobutyl alcohol, I obtain a distillate which is an excellent solvent of pyroxylin in the cold; or by using the higher fusel alcohols I obtain good menstrua for camphor or diluents for liquid solvents, like methyl alcohol and acetone. The oxidized solvents of a practical anhydrous nature, like those obtained by oxidizing a mixture of the fusel-oil alcohols, are very useful as correctors, or diluents, or menstrua for lighter solvents of a hydrous nature. Thus I find that by mixing oxidized crude fusel-oil with acetone I get a good solvent which is capable of making liquid solutions of pyroxylin which evaporate to a smooth lustrous film, and which is far superior to a mixture of acetone and unaltered fusel-oil, or acetone and refined amyl alcohol. The proportions given for oxidizing fusel-oil alcohols are for a strong reaction. I prefer in practice to use a more limited oxidation by employing sometimes as much as double the amount of alcohols. This forms a mixture less liable to strong smelling products and valuable as a diluent.

The products from mixtures containing the lowest alcohols, like methyl or ethyl, are useful as light solvents or as improved substitutes for the compound solvents heretofore used, which contained these low alcohols as necessary ingredients. In this case I prefer a limited oxidation. Such a solvent is produced by distilling the following mixture and neutralizing, dehydrating, and rectifying the distillate in the usual way: of a mixture of equal parts of methyl alcohol containing the usual percentage of acetone, (wood-spirit,) ethyl alcohol, and crude fusel-oil, consisting principally of low alcohols, four parts; sulfuric acids, two parts; peroxid of manganese, two parts; water, two and one-half parts.

It will be noticed that in producing light solvents I use a mixture of light alcohols, and for heavy solvents I employ the heavier alcohols. This is to prevent too strong an oxidation of the lighter constituents; but my solvents can be mixed after the oxidation has taken place according to the effect desired. I find, however, that the employment of this new class of solvents is not incompatible with the use of other well-known solvents—such as acetone, wood-spirits, acetate of amyl, &c.—and the operator can use the present class of solvents either by themselves or associated with any other menstrua, as he may prefer, although he will find that the solvents of this application are capable of a wide range of usefulness, and practically all of the effects obtainable by the employment of the old liquid solvents can be produced with them.

Owing to the highly-complex nature of my new solvents it is difficult to represent all of the products of the oxidizing action by means of chemical formulæ. I am not looking for nor dependent on the production of definite chemical substances for a successful solvent, as I find the chief value of my solvents resides in the mixture of substances resulting from the oxidizing reaction. However, a study of this subject has enabled me to describe some of the principal reactions.

When one or more of the monohydric aliphatic alcohols is subjected to oxidation, the first product of such oxidation is an aldehyde or aldehydes. Taking ethylic alcohol as an example, the reaction is: $CH_3.CH_2.OH + O = CH_3CHO + H_2O$. Considered as a class, the aldehydes are comparatively unstable and, by the action of various reagents, may easily be converted into other substances. Thus by oxidation they are converted into acids: $CH_3CHO + O = CH_3CO_2H$. The mere presence of some substances appears to be sufficient to cause their polymerisation.

I have found that in acting upon a mixture of alcohols with oxidizing agents, as herein described, the mixture of substances produced contains aldehydes, ketones, (the latter produced when secondary alcohols are present in the mixture,) compound esters, dialdehydes, acetals, (compounds of aldehydes with alcohols,) compounds of the aldehydes with the organic acids, unaltered alcohols, and other substances undetermined, although the latter form only a small portion of the whole.

In using the compound solvents produced by the present method a knowledge of the art possessed by the skilled operator is all that is required to enable him to apply them to the various products which it is desired to manufacture. The nature of the solvent is also to be taken into consideration in making these various products, for in evaporating the solvent from the compound (which is always done in practical applications) certain undesirable residues are apt to be left in the product unless care be taken to take a proper solvent for the solution.

While my invention embraces certain new combinations heretofore not known, as pyroxylin solvents, it is true, nevertheless, that a great many known solvent substances, resulting from the reactions I have described, exist in the final compound solvent as separable bodies exerting their individual solvent powers in the well-known manner. For instance, in acting upon a mixture of methyl and ethyl alcohols the result of the reaction is a production, to some extent, of the oxidized wood-alcohol described by me as a solvent in United States Patent No. 269,340 of December 19, 1892. I recognize, therefore, that in my present compound solvents wherever this oxidized wood-alcohol occurs I am using it according to my former invention of December 19, 1892, just referred to, or the presence of fusel-oil, for instance, in a solvent used in connection with camphor is an employment of my Patent No. 269,343 of December 19, 1892.

The production of the present series of solvents is confined to acting on methyl and ethyl alcohols and those alcohols which are contained in the different fusel-oils in amounts sufficient for practical use.

I wish it to be distinctly understood that the solvents I produce are practically oxidation products of a mixture of certain alcohols, and any departure from or variation of the methods I have recommended which will still form oxidation products of the alcohols is a use of my invention when such products are employed as solvents of pyroxylin. For instance, it is a common practice to form acetate of amyl for use as a solvent in making pyroxylin compounds of a fluid nature according to my Patent No. 269,340 by acting on a mixture of fusel-oil and benzene with acetic and sulfuric acids. Any production of oxidation products in a similar manner and their subsequent employment as pyroxylin solvents would be a use of my present invention.

What I claim, and desire to secure by Letters Patent, is—

1. The method of producing pyroxylin compounds which consists in combining pyroxylin with the solvents obtained as the result of oxidizing a mixture of alcohols, substantially as described.

2. As a new composition of matter, a compound containing pyroxylin and one or more solvents containing an oxidized mixture of alcohols, substantially as described.

3. As a new composition of matter, a compound containing pyroxylin, one or more known solvents of pyroxylin, and one or more solvents containing an oxidized mixture of alcohols, substantially as described.

In witness whereof I have hereunto signed my name this 17th day of June, 1895.

JOHN H. STEVENS.

In presence of—
ABRAHAM MANNERS,
F. WM. RAWLE.